United States Patent
Wu et al.

(10) Patent No.: US 12,170,463 B2
(45) Date of Patent: Dec. 17, 2024

(54) MOTOR ROTOR APPARATUS AND MOTOR

(71) Applicant: Huawei Technologies Co., Ltd., Shenzhen (CN)

(72) Inventors: Xiaopeng Wu, Shanghai (CN); Yibo Wang, Shanghai (CN); Gurakuq Dajaku, Neubiberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 830 days.

(21) Appl. No.: 17/017,151

(22) Filed: Sep. 10, 2020

(65) Prior Publication Data

US 2020/0412192 A1    Dec. 31, 2020

Related U.S. Application Data

(63) Continuation of application No. PCT/CN2019/070286, filed on Jan. 3, 2019.

(30) Foreign Application Priority Data

May 29, 2018 (CN) .......................... 201810535274.9

(51) Int. Cl.
  *H02K 1/30* (2006.01)
  *H02K 1/27* (2022.01)
  *H02K 1/276* (2022.01)

(52) U.S. Cl.
  CPC .............. *H02K 1/30* (2013.01); *H02K 1/276* (2013.01)

(58) Field of Classification Search
  CPC ......... H02K 1/276; H02K 1/30; H02K 1/2766

USPC ...................................................... 310/156.01
  See application file for complete search history.

(56) References Cited

U.S. PATENT DOCUMENTS

| | | | |
|---|---|---|---|
| 7,355,309 B2 * | 4/2008 | Costin | H02K 1/2773 310/156.08 |
| 9,806,570 B2 * | 10/2017 | Hamanaka | H02K 1/2766 |
| 2010/0123364 A1 * | 5/2010 | Hsu | H02K 1/246 310/180 |
| 2012/0267977 A1 | 10/2012 | Merwerth et al. | |
| 2013/0026872 A1 | 1/2013 | Cirani et al. | |
| 2014/0062244 A1 | 3/2014 | Sano et al. | |
| 2015/0022042 A1 | 1/2015 | Han et al. | |
| 2015/0102695 A1 | 4/2015 | Zhang et al. | |
| 2015/0318747 A1 | 11/2015 | Kamiyoshihara et al. | |
| 2016/0285330 A1 * | 9/2016 | Mukai | F25B 31/026 |
| 2018/0041080 A1 | 2/2018 | Nakano et al. | |

FOREIGN PATENT DOCUMENTS

| | | |
|---|---|---|
| CN | 202145613 U | 2/2012 |
| CN | 102939699 A | 2/2013 |
| CN | 103683597 A | 3/2014 |
| CN | 103683603 A | 3/2014 |
| CN | 103780038 A | 5/2014 |
| CN | 203911704 U | 10/2014 |

(Continued)

*Primary Examiner* — Alex W Mok
(74) *Attorney, Agent, or Firm* — Conley Rose, P.C.

(57) ABSTRACT

A motor rotor apparatus includes a rotor core and a bonding element embedded in the rotor core. The rotor core includes a first air sub-groove, and the first air sub-groove includes a first tooth and a first slot. The bonding element includes a second tooth and a second slot. The first tooth is engaged with the second tooth, and the first slot is engaged with the second slot.

20 Claims, 7 Drawing Sheets

(56) References Cited

FOREIGN PATENT DOCUMENTS

| | | | |
|---|---|---|---|
| CN | 104300712 | A | 1/2015 |
| CN | 104578650 | A | 4/2015 |
| CN | 104600939 | A | 5/2015 |
| CN | 105720716 | A | 6/2016 |
| CN | 205304437 | U | 6/2016 |
| CN | 106849417 | A | 6/2017 |
| CN | 107482811 | A | 12/2017 |
| CN | 107994699 | A | 5/2018 |
| DE | 102015203018 | A1 | 8/2016 |
| EP | 2600496 | A1 | 6/2013 |
| EP | 3021459 | A1 | 5/2016 |
| JP | 2002223538 | A | 8/2002 |
| JP | 2008278696 | A | 11/2008 |
| JP | 2011135728 | A | 7/2011 |
| JP | 2012085433 | A | 4/2012 |
| JP | 2012213268 | A | 11/2012 |
| JP | 2013066345 | A | 4/2013 |
| JP | 2014100048 | A | 5/2014 |
| JP | 2015144501 | A | 8/2015 |
| KR | 20150063217 | A | 6/2015 |
| WO | 2017026065 | A1 | 2/2017 |
| WO | 2017061305 | A1 | 4/2017 |
| WO | 2018024467 | A1 | 2/2018 |

\* cited by examiner

MOTOR ROTOR APPARATUS AND MOTOR

CROSS-REFERENCE TO RELATED APPLICATIONS

This application is a continuation of International Patent Application No. PCT/CN2019/070286 filed on Jan. 3, 2019, which claims priority to Chinese Patent Application No. 201810535274.9 filed on May 29, 2018. The disclosures of the aforementioned applications are hereby incorporated by reference in their entireties.

TECHNICAL FIELD

This application relates to the field of electromechanical devices, and in particular, to a motor rotor apparatus and a motor.

BACKGROUND

As a quantity of vehicles increases annually, more oil is consumed and environmental protection becomes more and more urgent. This forces the vehicle industry to be developed with a notion of energy saving and environmental protection, and electric vehicles therefore emerge. An increasingly popular electric vehicle generally uses a permanent-magnet synchronous motor with high power density. The permanent-magnet synchronous motor is actually an alternating current motor. A permanent magnet is installed in a rotor of the motor to generate a permanent rotor magnetic field. A three-phase alternating current with a phase difference of 120° is supplied to a motor stator to generate a rotating magnetic field. The stator magnetic field interacts with the rotor magnetic field to drive the permanent-magnet motor to rotate.

To increase power density and torque density of the motor, permanent-magnet torque or magnetic reluctance torque may be increased. The magnetic reluctance torque is directly related to a stator magnetic circuit and a rotor magnetic circuit of the motor. A salient rate of the motor may be increased by increasing a quantity of air regions in the rotor, thereby increasing the magnetic reluctance torque.

Although content of the magnetic reluctance torque is increased by increasing the quantity of air regions in the rotor, a magnetic bridge is formed between the air regions or between the air region and a circumferential surface of the rotor. Consequently, a centrifugal force generated by a motor rotor that rotates at a high speed is applied to the magnetic bridge, and the magnetic bridge in a rotor core is prone to be damaged due to stress, decreasing robustness of the rotor deteriorates and restricting a maximum speed of the motor to reaching a comparatively high speed. This is the reason that a maximum speed of an electric vehicle is far lower than that of a fuel-powered vehicle.

SUMMARY

This application provides a motor rotor apparatus and a motor. The motor rotor apparatus can effectively absorb centrifugal force generated when a rotor rotates at a high speed. This disperses stress caused by the centrifugal force to a magnetic bridge, ensures robustness of the rotor that rotates at a high speed, and can increase a maximum speed of the motor to some extent.

A first aspect of this application provides a motor rotor apparatus, where the motor rotor apparatus includes a rotor core and a bonding element. The bonding element is embedded in the rotor core, and the bonding element is made of a non-magnetic high-hardness material such as an aluminum material or a ceramic material. The bonding element made of the non-magnetic material does not affect distribution of a magnetic field.

The rotor core is provided with a first air sub-groove, and the first air sub-groove includes a first tooth and a first slot. A shape of the first tooth and a shape of the first slot are edge shapes of the first air sub-groove. Correspondingly, the bonding element and the first air sub-groove have a same shape, and the bonding element includes a second tooth and a second slot.

The first tooth of the first air sub-groove is engaged with the second tooth of the bonding element, and the first slot of the first air sub-groove is engaged with the second slot of the bonding element.

In this application, a salient rate can be increased using the air groove in the rotor core such that content of magnetic reluctance torque can be increased, and fewer permanent magnets are used, fewer rare earth resources are used, and manufacturing costs of a motor are reduced. In this application, the bonding element made of the non-magnetic high-hardness material is engaged with the air sub-groove in the rotor core. That is, the bonding element is engaged with the first air sub-groove with teeth and slots to form a bearing structure. The bearing structure can effectively absorb centrifugal force generated when a rotor rotates at a high speed. This significantly reduces stress on a rotor magnetic bridge, ensures robustness of the rotor that rotates at a high speed, and increases a speed of a motor as much as possible.

With reference to the first aspect of the embodiments of this application, in a first implementation of the first aspect of the embodiments of this application, the rotor core is further provided with a second air sub-groove. The second air sub-groove and the first air sub-groove are connected head to tail to form a first air groove, the first air sub-groove and the second air sub-groove are connected, and the second air sub-groove is configured to accommodate a permanent magnet. The permanent magnet, also referred to as a hard magnet, is not prone to be magnetized by another object or demagnetized. In addition, polarity of the permanent magnet does not change, and the permanent magnet has a comparatively stable characteristic.

The second air sub-groove in this application is configured to accommodate the permanent magnet that generates a permanent magnetic field. The permanent magnet can generate the permanent magnetic field, and the permanent magnetic field is attracted by a rotating magnetic field on a stator such that the permanent magnetic field rotates with the rotating magnetic field and drives the rotor to rotate. However, the bonding element that is made of the non-magnetic material and that is matched with the first air sub-groove does not affect a magnetic distribution of the permanent magnet.

With reference to the first aspect or the first implementation of the first aspect of the embodiments of this application, in a second implementation of the first aspect of the embodiments of this application, the rotor core is further provided with a second air groove, and the second air groove is configured to accommodate the permanent magnet.

In this application, by disposing a plurality of air grooves, a d-axis magnetic circuit and a q-axis magnetic circuit of the motor can be changed, and the salient rate of the motor is increased such that the content of the magnetic reluctance torque can be increased, and fewer permanent magnets are used.

With reference to any one of the first aspect to the second implementation of the first aspect of the embodiments of this application, in a third implementation of the first aspect of the embodiments of this application, a first bearing structure includes the first air groove and the second air groove, and may further include another similar air groove, the rotor core includes a plurality of first bearing structures, and the plurality of bearing structures form a complete rotor core. A tooth-slot structure in the first air sub-groove and the air groove that is configured to reduce content of magnetic reluctance are evenly distributed in the rotor core.

In this application, the plurality of bearing structures distributed in the rotor core can greatly disperse a force that is generated by the rotor that rotates at a high speed and that is originally applied to the magnetic bridge.

With reference to any one of the first aspect to the third implementation of the first aspect of the embodiments of this application, in a fourth implementation of the first aspect of the embodiments of this application, the first air sub-groove further includes a plurality of first teeth and a plurality of first slots, and the plurality of first teeth and the plurality of first slots are alternately distributed, and the bonding element further includes a plurality of second teeth and a plurality of second slots, and the plurality of second teeth and the plurality of second slots are alternately distributed.

In this application, the bonding element is connected to the air groove by matching the plurality of teeth with the plurality of slots. Such a structure resolves a problem of ensuring the robustness of the rotor that rotates at a high speed by sacrificing magnetic reluctance torque and using more permanent magnets in a conventional permanent-magnet motor such that less permanent magnets are used and robustness of the rotor that rotates at a high speed can be also ensured, while efficiency and power density are ensured.

With reference to any one of the first aspect to the fourth implementation of the first aspect of the embodiments of this application, in a fifth implementation of the first aspect of the embodiments of this application, the first tooth and the first slot may be in rectangular or triangular shapes.

In this application, shapes of the tooth and the slot may be flexibly selected based on different application scenarios or process requirements. This reflects flexibility and practicability of the solution.

With reference to any one of the first aspect to the fifth implementation of the first aspect of the embodiments of this application, in a sixth implementation of the first aspect of the embodiments of this application, a first magnetic bridge is formed between the first air groove and the second air groove, a second magnetic bridge is formed between the first air groove and a circumferential surface of the rotor core, and a third magnetic bridge is formed between the second air groove and the circumferential surface of the rotor core. The magnetic bridge is a part of the rotor core, and is prone to be damaged due to the stress generated by the rotor that rotates at a high speed. In this application, the tooth-slot structure is used, and stress that is originally applied to the magnetic bridge can be absorbed. The speed of the motor is not restricted due to robustness, and the speed of the motor can be increased to some extent.

The motor in the embodiments of this application includes the motor rotor apparatus according to any one of the first aspect to the sixth implementation of the first aspect.

It can be learned from the foregoing technical solutions that this application has the following advantages.

This application provides the motor rotor apparatus. The motor rotor apparatus includes the rotor core and the bonding element. The bonding element is disposed in the rotor core. The rotor core is provided with the first air groove, the first air groove includes the first air sub-groove, and the first air sub-groove includes the first tooth and the first slot. The bonding element includes the second tooth and the second slot. The first tooth is engaged with the second slot, and the first slot is engaged with the second tooth. Using the foregoing structure, the bonding element is engaged with the first air sub-groove in the rotor core to form the bearing surface such that the centrifugal force generated by the rotor that rotates at a high speed is effectively absorbed, and the stress caused by the centrifugal force to the magnetic bridge is dispersed. This ensures robustness of the rotor that rotates at a high speed, and increases the maximum speed of the motor to some extent.

DESCRIPTION OF EMBODIMENTS

This application provides a motor rotor apparatus. A bonding element is engaged with a first air sub-groove in a rotor core to form a bearing surface such that centrifugal force generated by a rotor that rotates at a high speed can be effectively absorbed, and the centrifugal force applied to a magnetic bridge is dispersed. This ensures robustness of the rotor that rotates at a high speed, and can increase a maximum speed of a motor to some extent.

Figure 1:
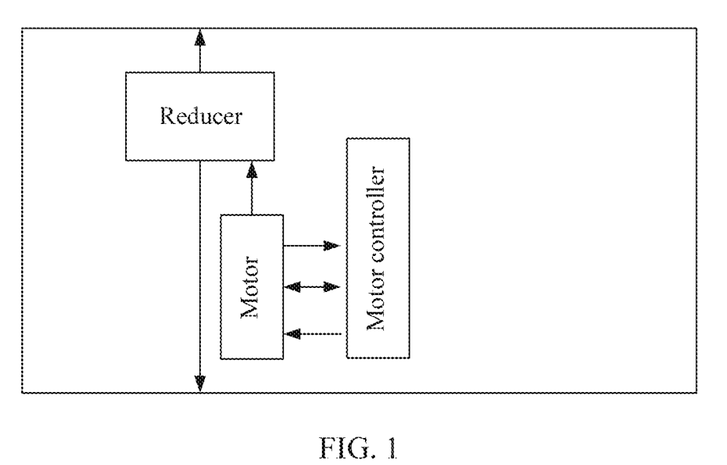
FIG. 1 is a simplified schematic diagram of a motor-driven vehicle.

Increasingly popular electric vehicles comply with an energy-saving and environmental protection notion in the modern society. Therefore, improving performance of the electric vehicles becomes a main problem to be resolved. FIG. 1 is a simplified schematic diagram of a motor-driven vehicle. A permanent-magnet synchronous motor may serve as a main drive motor of the electric vehicle, to generate drive torque for the electric vehicle in order to provide a power source. The motor is driven by a motor controller unit (MCU) to output driving force, and the MCU controls the motor to work based on a specified direction, speed, angle, and response time using an active operation of an integrated circuit. The motor is connected to a reducer using a mechanical structure, and outputs the driving force to wheels using the reducer to drive the electric vehicle.

Figure 2:
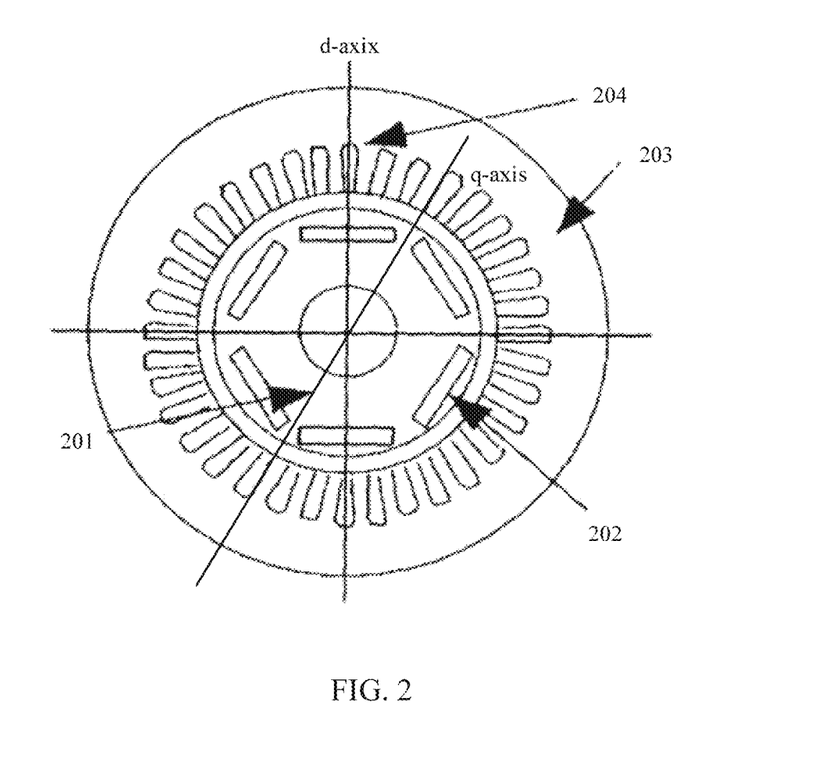
FIG. 2 is a schematic structural diagram of a motor.

FIG. 2 is a schematic structural diagram of a typical motor. It can be learned that an effective part of the motor may include a rotor core 201, a permanent magnet 202, a stator core 203, and a stator coil 204. The stator coil 204 is installed in a slot of the stator core 201, and the stator coil 204 and the stator core 201 form a stator. A three-phase current is input into the stator coil 204 to generate a rotating magnetic field.

The permanent magnet 202 is installed in the rotor core 201, and the permanent magnet 202 and the rotor core 201 form a rotor. The permanent magnet 202 can generate a permanent magnetic field, and the permanent magnetic field is attracted by the rotating magnetic field on the stator such that the permanent magnetic field rotates with the rotating magnetic field, and the permanent magnetic field drives the rotor to rotate. A rotation frequency of the permanent magnetic field is the same as a rotation frequency of the stator magnetic field.

Torque refers to moment of force that makes a mechanical element rotate, and is measured in Newton-meter. The mechanical element suffers a specific degree of torsional deformation under an action of the torque, and therefore torque is also referred to as torque sometimes. Torque is a basic load form of various mechanical drive shafts, and is closely related to a working capacity, energy consumption, efficiency, an operation life, and safety performance of a power machine. A torque equation of a permanent-magnet synchronous motor is as follows:

$$T_e = \frac{3}{2} p [\varphi_{pm} i_{qs} - (L_{qs} - L_{ds}) i_{qs} i_{ds}].$$

In controlling of the permanent-magnet synchronous motor, to obtain a control characteristic similar to that of a direct current motor, a coordinate system may be optionally established on the motor rotor, and the coordinate system rotates synchronously with the rotor. FIG. 2 is used to explain meanings of the parameters in the torque equation. As shown in the figure, a d-axis represents a center line of the permanent magnet, a q-axis represents a center line of two adjacent permanent magnets, i represents current, L represents inductance, $\varphi_{pm} i_{qs}$ represents content of permanent-magnet torque, $\varphi_{pm}$ represents permanent-magnet magnetic linkage on the motor rotor, and $(L_q - L_d) i_{qs} i_{ds}$ represents content of magnetic reluctance torque. It can be learned from the torque equation that torque of the permanent-magnet synchronous motor includes two parts: the permanent-magnet torque $\varphi_{pm} i_{qs}$ and the magnetic reluctance torque $(L_q - L_d) i_{qs} i_{ds}$.

A method for increasing the permanent-magnet torque is to use more permanent magnets. In a specific range, higher usage of the permanent magnets or a better characteristic of the permanent magnet indicates better performance of the motor. However, a consequence is that more rare earth resources are used, damaging environment and greatly increasing motor costs. Therefore, it is unrealistic to increase the permanent-magnet torque using more permanent magnets. However, overall torque can be increased by increasing the content of the magnetic reluctance torque.

The content of the magnetic reluctance torque may be increased using a design of a magnetic circuit of the motor stator and a design of a magnetic circuit of the motor rotor. A key of the design is to increase a difference between $L_q$ and $L_d$, that is, to increase a salient rate of the motor. This may be implemented by adding an air region to the rotor. However, the way of adding an air region to the rotor usually degrades robustness of the motor rotor that rotates at a high speed, and a maximum speed of the motor rotor is not high. Consequently, a maximum speed of an electric vehicle is far less than a speed of a fuel-powered vehicle.

To resolve the disadvantage of comparatively poor robustness of the rotor that rotates at a high speed, an embodiment of this application provides a motor rotor apparatus. The motor rotor apparatus includes a rotor core and a bonding element. The bonding element is disposed in the rotor core, and the bonding element is configured to be engaged with an air groove in the rotor core.

Figure 3:
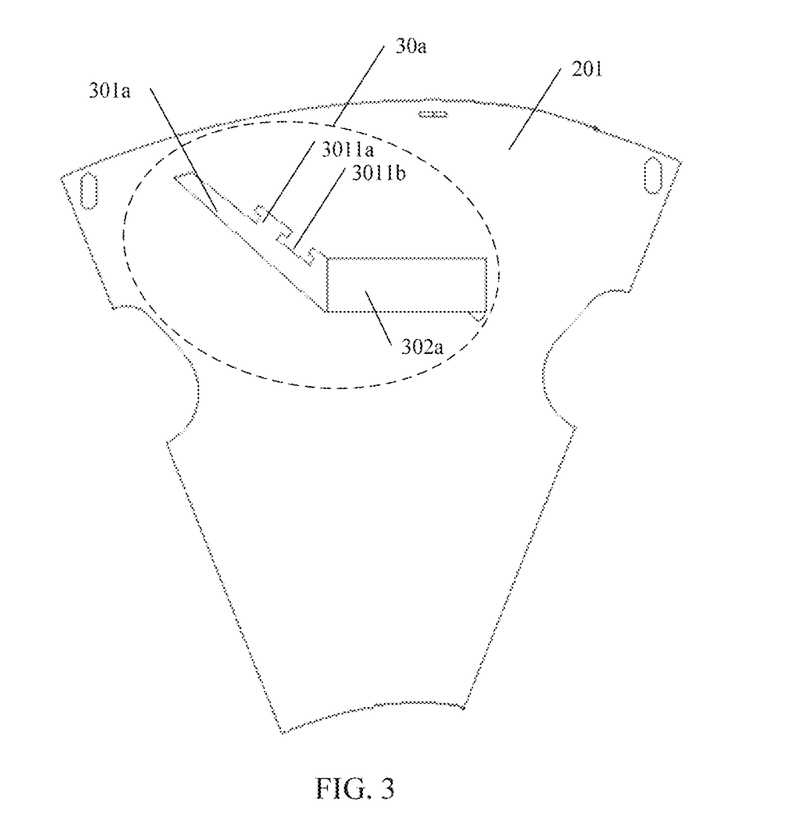
FIG. 3 is a schematic diagram of a partial structure of a motor rotor apparatus according to an embodiment of this application.

An embodiment of this application provides a bearing structure in which an air groove is engaged with a tooth-slot shaped boding element. The bearing structure is located in the motor rotor core. FIG. 3 is a schematic cross-sectional diagram of the rotor core including the bearing structure according to an embodiment of this application. The rotor core 201 is provided with a first air groove 30a. The first air groove 30a includes a first air sub-groove 301a, and the first air sub-groove 301a includes a first tooth 3011a and a first slot 3011b. The first tooth 3011a is a hollow part, and the first slot 3011b is a solid part in the rotor core. A shape of the first tooth 3011a is the same as that of the first slot 3011b, and the first tooth 3011a is adjacent to the first slot 3011b to form a T-shaped sawtooth.

Figure 4:
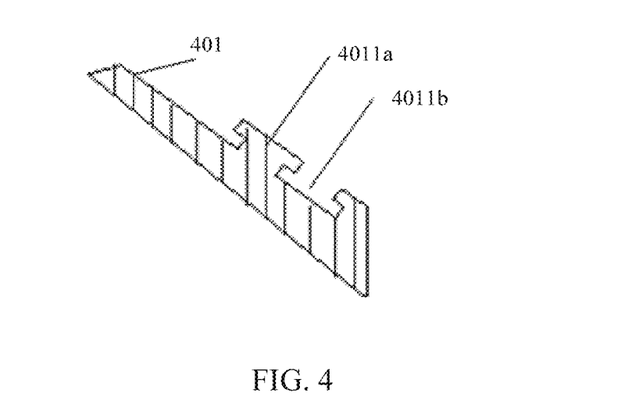
FIG. 4 is a schematic structural diagram of a bonding element according to an embodiment of this application.

The first air sub-groove 301a is configured to accommodate a bonding element. The bonding element is a non-magnetic high mechanical strength material. A schematic structural diagram of the bonding element is shown in FIG. 4. The bonding element 401 and the first air sub-groove 301a have a same shape. The bonding element 401 is engaged with the first air sub-groove 301a to form the bearing structure, to disperse centrifugal force generated when a rotor rotates at a high speed.

Further, the bonding element 401 includes a second tooth 4011a and a second slot 4011b. The second tooth 4011a is a solid part, and the second slot 4011b is a hollow part. The second tooth 4011a of the bonding element 401 and the first tooth 3011a of the first air sub-groove 301a have a same shape. The second tooth 4011a of the bonding element 401 fill the hollow part of the first tooth 3011a of the first air sub-groove 301a. The second slot 4011b of the bonding element 401 and the first slot 3011b of the first air sub-groove 301a have a same shape. The hollow part of the second slot 4011b of the bonding element 401 is configured to accommodate the solid part of the first slot 3011b of the first air sub-groove 301a, and the second slot 4011b and the first slot 3011b are engaged with each other.

The rotor core 201 is further provided with a second air sub-groove 302a. The second air sub-groove 302a is configured to accommodate a permanent magnet. The permanent magnet is configured to generate a rotor magnetic field in a motor in order to generate permanent-magnet torque by acting with a stator magnetic field. A permanent magnet is usually made from rare earth resources. For example, a permanent-magnet motor usually generates a magnetic field using a neodymium-iron-boron permanent magnet.

A shape and a size of the second air sub-groove 302a may be determined based on a shape and a size of the permanent magnet. For example, when the permanent magnet is in a bar shape, the second air sub-groove 302a is in a rectangle shape or another shape capable of accommodating the bar shape of the permanent.

In this embodiment of this application, the air groove is disposed to increase content of magnetic reluctance torque of the motor. Therefore, when content of total torque is fixed, a permanent-magnet torque component may be appropriately reduced, that is, less permanent magnets are used. In addition, a structure in which the first air sub-groove 301a and the bonding element 401 are engaged with each other may be used to disperse the centrifugal force generated by the rotor that rotates at a high speed, to enhance robustness of the rotor and ensure that the rotor can rotate at a specific high speed.

Figure 5:
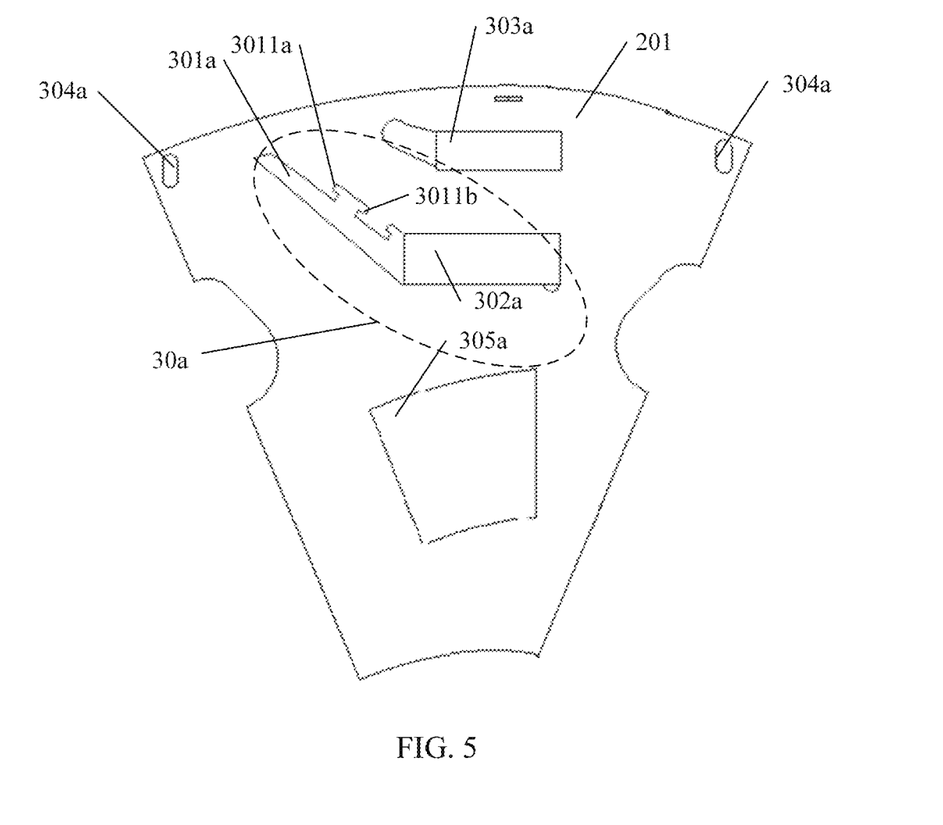
FIG. 5 is a schematic diagram of a partial structure of another motor rotor apparatus according to an embodiment of this application.

Optionally, based on the foregoing embodiment, in another embodiment of the motor rotor apparatus provided in the embodiments of this application, the foregoing motor rotor apparatus further includes a second air groove 303a. As shown in FIG. 5, the second air groove 303a is located above the first air groove, and is sandwiched between the first air groove 30a and a circumferential surface of the rotor core 201. The second air groove 303a and the first air groove 30a are arranged along a radius direction of the rotor. The second air groove 303a accommodates at least one permanent magnet.

The motor rotor apparatus may further be provided with some air regions, for example, an air region 304a and an air region 305a. Air is filled in the air regions, to change a d-axis magnetic circuit and a q-axis magnetic circuit of the motor, and increase a salient rate of the motor in order to increase the content of the magnetic reluctance torque, and use less permanent magnets.

The first air groove 30a (including the first air sub-groove 301a and the second air sub-groove 302a), the second air groove 303a, the air region 304, and the air region 305 on the motor rotor form a first bearing structure. The first bearing structure is a part of a three-dimensional structure in the rotor core. From a perspective of a cross section, the first bearing structure is a part of a sector on an end face of the rotor core.

In this embodiment of this application, a topological structure with double-layered air grooves can greatly increase the salient rate of the motor, thereby increasing the content of the magnetic reluctance torque. In this way, when power and torque of the motor are respectively the same as power and torque of a conventional permanent-magnet synchronous motor, approximately 80% of the permanent magnets can be reduced.

Figure 6:
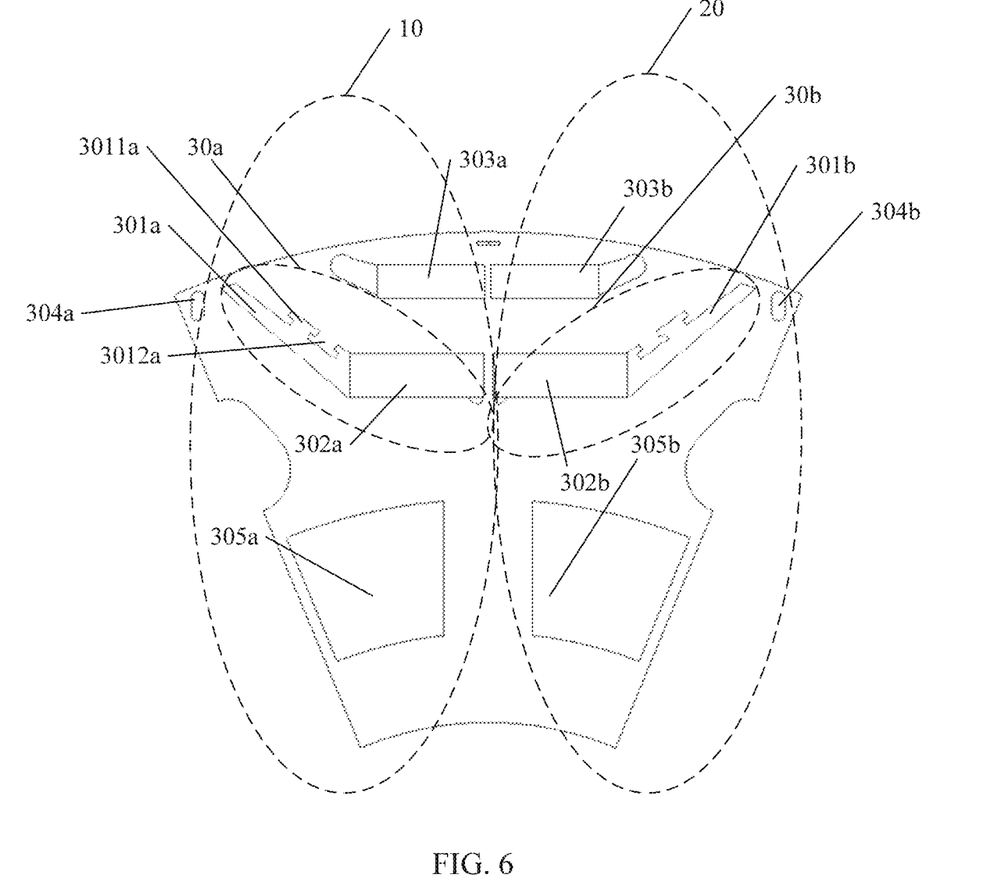
FIG. 6 is a schematic diagram of a structure including two bearing structures according to an embodiment of this application.

Based on the foregoing embodiment, in another embodiment of the motor rotor apparatus provided in the embodiments of this application, the foregoing motor rotor apparatus includes a plurality of first bearing structures, and all the bearing structures have a same size and a same shape. As shown in FIG. 6, two bearing structures are used as an example for description. The motor rotor apparatus includes a first bearing structure 10 and a second bearing structure 20. The first bearing structure 10 includes the first air groove 30a (including the first air sub-groove 301a and the second air sub-groove 302a), the second air groove 303a, the air region 304a, and the air region 305a. Correspondingly, the second bearing structure 20 includes a third air groove 30b (including a third air sub-groove 301b and a fourth air sub-groove 302b), a fourth air groove 303b, an air region 304b, and an air region 305b.

The second bearing structure 20 is symmetrically distributed with the first bearing structure 10 using a radius direction as a center. Further, the first air groove 30a is symmetrically distributed with the third air groove 30b, and the second air groove 303a is symmetrically distributed with the fourth air groove 303b, and the air region 304a is symmetrically distributed with the air region 304b, and the air region 305a is also symmetrically distributed with the air region 305b.

Based on the embodiment in FIG. 6, in another embodiment of the motor rotor apparatus provided in the embodiments of this application, the first air sub-groove further includes a plurality of first teeth and a plurality of first slots. Further, the motor rotor apparatus is shown in FIG. 7, the plurality of first teeth 3011a and the plurality of first slots 3011b are alternately distributed to form a sawtooth shape.

Figure 7:
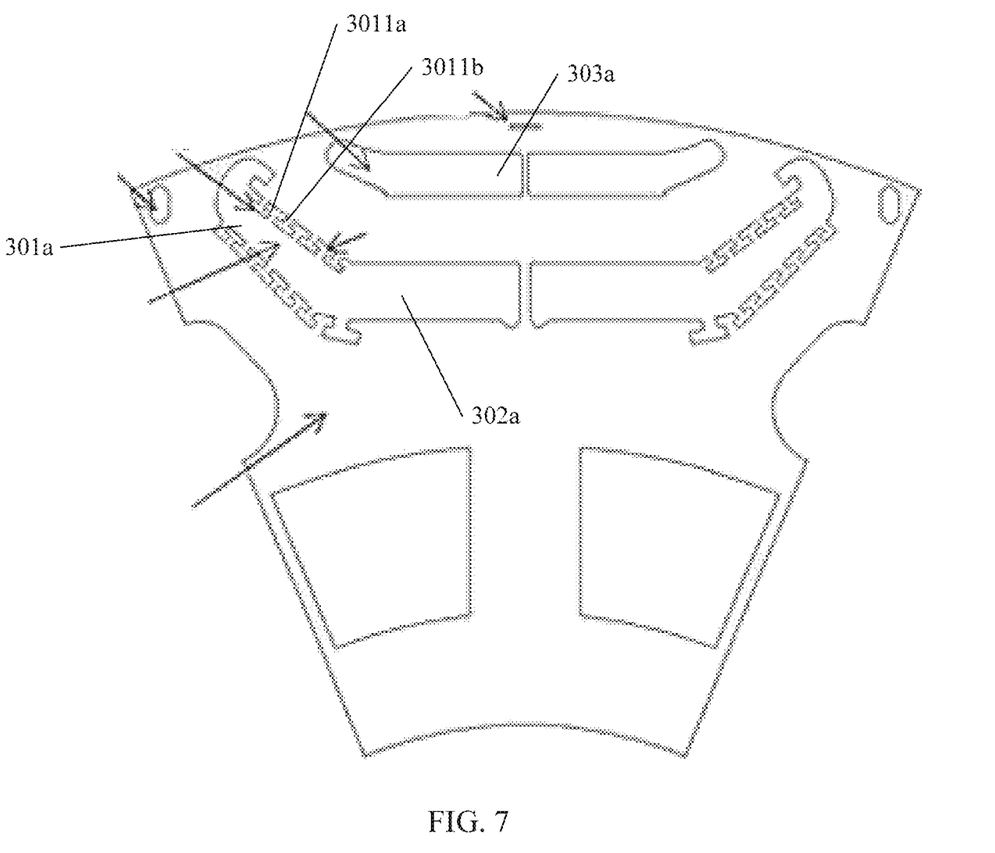
FIG. 7 is a schematic structural diagram of a motor rotor apparatus including a plurality of teeth and a plurality of slots according to an embodiment of this application.
Figure 8:
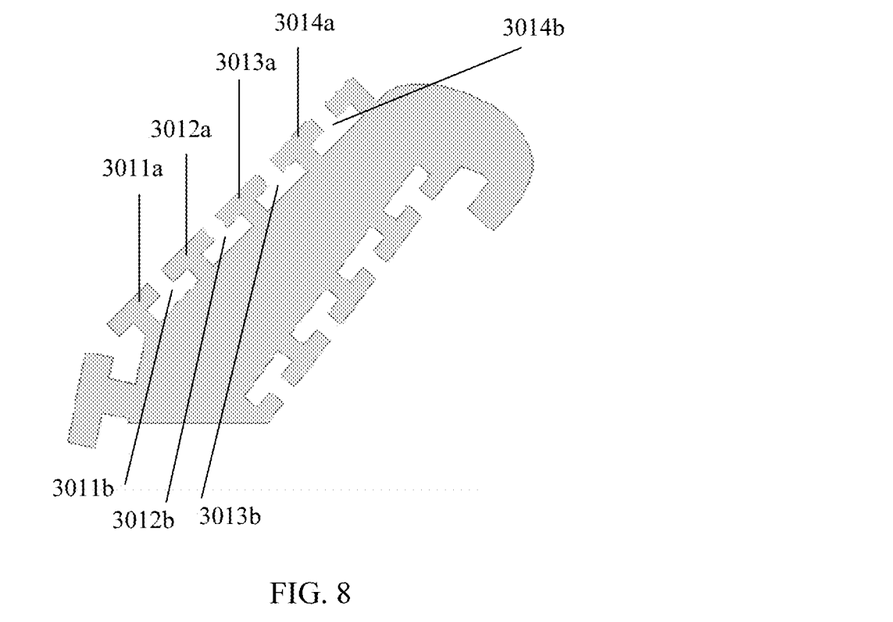
FIG. 8 is an enlarged schematic diagram of a first air sub-groove.

FIG. 8 is an enlarged schematic diagram of the first air sub-groove 301a in FIG. 7. The first air sub-groove 301a includes the first tooth 3011a and teeth 3012a, 3013a, and 3014a that are similar to the first tooth. The first air sub-groove 301a further includes the first slot 3011b and slots 3012b, 3013b, and 3014b that are similar to the first slot.

A part between every two adjacent teeth is a slot, and a part between every two adjacent slots is a tooth. Further, for example, a part between the tooth 3011a and the tooth 3012a is the slot 3011b, and a part between the slot 3011b and the slot 3012b is the tooth 3012a.

The first tooth is a hollow part, and the hollow part is configured to accommodate a solid part of the second tooth of the bonding element. The first slot is a solid part in the rotor core, and the solid part is configured to fill a hollow part of the second slot of the bonding element.

Figure 9:
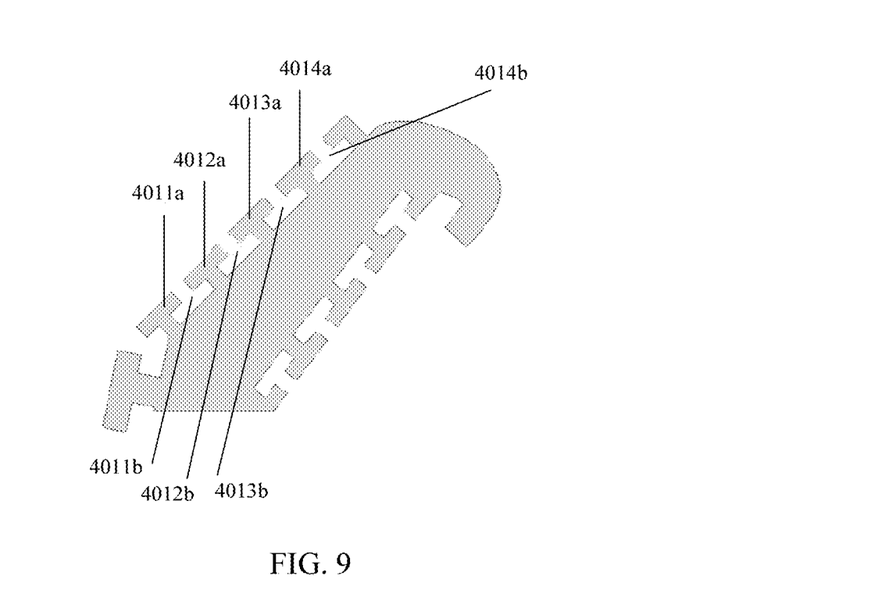
FIG. 9 is a schematic structural diagram of a bonding element including a plurality of teeth and a plurality of slots according to an embodiment of this application.

The first air sub-groove in which the plurality of teeth and the plurality of slots are alternately distributed corresponds to the bonding element that has a same shape as the first air sub-groove. The bonding element 401 further includes a plurality of second teeth 4011a and a plurality of second slots 4011b. FIG. 9 is a schematic structural diagram of the bonding element. The bonding element includes the plurality of second teeth 4011a and the plurality of second slots 4011b. Further, the bonding element includes the second tooth 4011a and teeth 4012a, 4013a, and 4014a that are similar to the second tooth, and includes the second slot 4011b and slots 4012b, 4013b, and 4014b that are similar to the second slot.

In addition, the second teeth 4011 are alternately distributed with the second slots 4012 to form a sawtooth shape, that is, a part between every two adjacent teeth of the bonding element is a slot, and a part between every two adjacent slots is a tooth. Further, for example, a part between the tooth 4011a and the tooth 4012a is the slot 4011b, and a part between the slot 4011b and the slot 4012b is the tooth.

The second tooth 4011a is a solid part, and the solid part is configured to fill the first tooth 3011a of the first air sub-groove 301a. The second slot 4011b is a hollow part, and the hollow part is configured to accommodate the solid part of the first slot 3011b of the first air sub-groove 301a. The first tooth 3011a of the first air sub-groove 301a is engaged with the second tooth 4011a of the bonding element, and the first slot 3011b of the first air sub-groove is engaged with the second slot 4011b of the bonding element. Other teeth and other slots are respectively engaged with each in a same manner. A plurality of groups of teeth and slots form a force bearing surface, to disperse centrifugal force generated by a rotor that rotates at a high speed.

Figure 10:
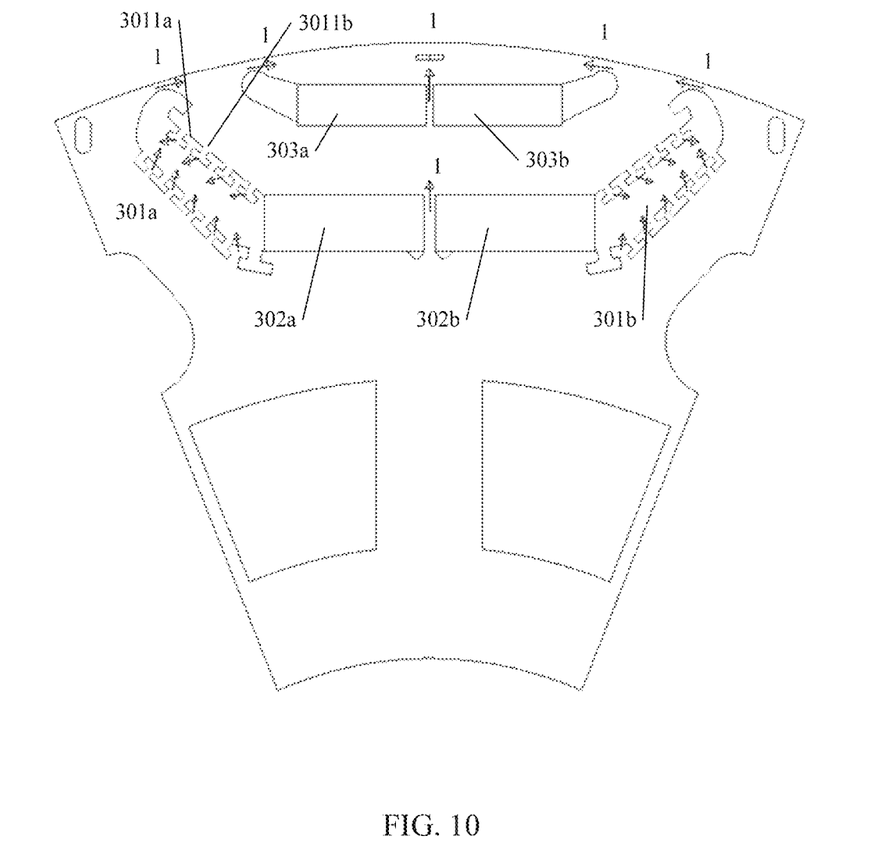
FIG. 10 is a schematic structural diagram of a magnetic bridge in a rotor core according to an embodiment of this application.

FIG. 10 is a schematic structural diagram of a magnetic bridge in a rotor core. As shown in the figure, a core part between a second air sub-groove 302a and a fourth air sub-groove 302b is a magnetic bridge, a core part between a second air groove 303a and a fourth air groove 303b is a magnetic bridge, core parts between a circumferential surface of the rotor core and each of a first air sub-groove 301a, the second air groove 303a, a third air sub-groove 301b, and the third air groove 303b are also magnetic bridges. Arrows indicated by 1 in the figure represent a schematic diagram of centrifugal force generated on the magnetic bridges by a rotor that rotates at a high speed. Arrows on the first air sub-groove 301a and the third air sub-groove 301b represent that a bearing surface that is formed by engaging teeth with slots can absorb the centrifugal force generated by the rotor.

A large quantity of experiments prove that such a tooth-slot structure can effectively absorb the centrifugal force that should be applied to the magnetic bridge. Experiments data shows that when the motor rotates at a speed of 16800 revolutions per minute (rpm), stress applied to the magnetic bridges between the circumferential surface of the rotor core and each of the first air sub-groove 301a, the second air groove 303a, the third air sub-groove 301b of the second air groove 30b, and the third air groove 303b is only 340 megapascals (Mpa), and stress applied to the magnetic bridge between the second air sub-groove 302a and the third air sub-groove 301b is only 370 Mpa, and this is less than that of a general silicon steel sheet.

In this embodiment of this application, a plurality of tooth-slot structures can greatly reduce the stress applied to the magnetic bridge, thereby ensuring robustness of the rotor that rotates at a high speed, and increasing a maximum speed of the motor.

Figure 11:
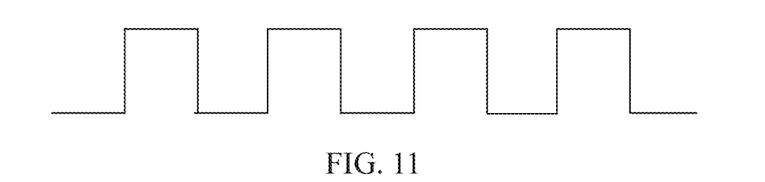
FIG. 11 is a schematic structural diagram of a tooth and a slot in rectangular shapes according to an embodiment of this application.
Figure 12:
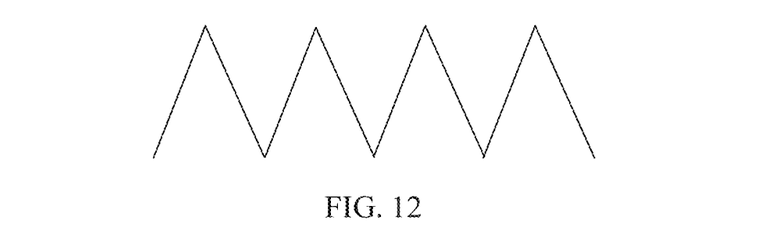
FIG. 12 is a schematic structural diagram of a tooth and a slot in triangular shapes according to an embodiment of this application.

Optionally, based on the embodiment corresponding to FIG. 7, in a motor rotor apparatus provided in another embodiment in the embodiments of this application, the first tooth and the first slot may be in rectangular or triangular shapes. A rectangular tooth-slot structure is shown in FIG. 11. Edge parts of the first air sub-groove and the fourth air sub-groove are the rectangular tooth-slot structure. Correspondingly, the bonding element is also the tooth-slot structure. Similarly, a triangular tooth-slot structure is shown in FIG. 12, and the bonding element is also the triangular tooth-slot structure.

In the embodiments of this application, regardless of the T-shaped tooth-slot structure, the rectangular tooth-slot structure, or the triangular tooth-slot structure, the centrifugal force applied to the magnetic bridge by the rotor that rotates at a high speed can be effectively absorbed. The plurality of tooth-slot structures reflects flexibility and practicability of this solution.

All or some of the foregoing embodiments may be implemented using software, hardware, firmware, or any combination thereof. When the software is used to implement the embodiments, all or some of the embodiments may be implemented in a form of a computer program product.

The computer program product includes one or more computer instructions. When the computer program instruction is loaded and executed on the computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line (DSL))) or wireless (for example, infrared, radio, or microwave) manner. The computer-readable storage medium may be any usable medium accessible by a computer, or a data storage device, such as a server or a data center integrated by one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings, direct couplings, or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, the part contributing to other approaches, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A motor rotor apparatus comprising:
a rotor core comprising:
a first air sub-groove, wherein the first air sub-groove comprises:
a first slot; and
a first tooth is adjacent to the first slot to form a T-shaped sawtooth;
a second air sub-groove coupled to the first air sub-groove to form a first air groove, and configured to accommodate a first permanent magnet;
a second air groove configured to accommodate a second permanent magnet, wherein a first magnetic bridge is formed between the first air groove and the second air groove;
a third air sub-groove symmetrically distributed with the first air sub-groove, wherein a second magnetic bridge is formed between a circumferential surface of the rotor core and the third air sub-groove; and
a fourth air sub-groove coupled to the third air sub-groove to form a third air groove and configured to accommodate a third permanent magnet, wherein the third air groove is symmetrically distributed with the first air groove, and wherein a third magnetic bridge is formed between the second air sub-groove and the fourth air sub-groove;
a first bonding element embedded in the first air sub-groove and comprising:
a second slot engaged with the first slot; and
a second tooth engaged with the first tooth and placed adjacent to the second slot to form the T-shaped sawtooth; and
a second bonding element embedded in the third air sub-groove.

2. The motor rotor apparatus of claim 1, wherein the second air sub-groove is coupled to the first air sub-groove in a head-to-tail manner.

3. The motor rotor apparatus of claim 1, wherein the rotor core further comprises a plurality of first bearing structures, and wherein each of the first bearing structures comprises the first air groove and the second air groove.

4. The motor rotor apparatus of claim 1, wherein a fourth magnetic bridge is formed between the first air groove and a circumferential surface of the rotor core, and wherein a fifth magnetic bridge is formed between the second air groove and the circumferential surface of the rotor core.

5. The motor rotor apparatus of claim 1, wherein the first air sub-groove further comprises a plurality of first teeth and a plurality of first slots that are alternately distributed.

6. The motor rotor apparatus of claim 1, wherein the first bonding element further comprises a plurality of second teeth and a plurality of second slots that are alternately distributed.

7. The motor rotor apparatus of claim 1, wherein the first tooth and the first slot are rectangular in shape.

8. The motor rotor apparatus of claim 1, wherein the first tooth and the first slot are triangular in shape.

9. The motor rotor apparatus of claim 1, wherein the first bonding element is a non-magnetic, high-hardness material.

10. A motor comprising:
a motor rotor apparatus comprising:
a rotor core comprising:
a first air sub-groove, wherein the first air sub-groove comprises:
a first slot; and
a first tooth is adjacent to the first slot to form a T-shaped sawtooth;
a second air sub-groove coupled to the first air sub-groove to form a first air groove, and configured to accommodate a first permanent magnet;
a second air groove configured to accommodate a second permanent magnet, wherein a first magnetic bridge is formed between the first air groove and the second air groove;
a third air sub-groove symmetrically distributed with the first air sub-groove, wherein a second magnetic bridge is formed between a circumferential surface of the rotor core and the third air sub-groove; and
a fourth air sub-groove coupled to the third air sub-groove to form a third air groove and configured to accommodate a third permanent magnet, wherein the third air groove is symmetrically distributed with the first air groove, and wherein a third magnetic bridge is formed between the second air sub-groove and the fourth air sub-groove;
a bonding element embedded in the first air sub-groove and comprising:
a second slot engaged with the first slot; and
a second tooth engaged with the first tooth and placed adjacent to the second slot to form the T-shaped sawtooth; and
a second bonding element embedded in the third air sub-groove.

11. The motor of claim 10, wherein the second air sub-groove is coupled to the first air sub-groove in a head to tail manner.

12. The motor of claim 10, wherein the rotor core further comprises a plurality of first bearing structures, and wherein each of the first bearing structures comprises the first air groove and the second air groove.

13. The motor of claim 10, wherein a fourth magnetic bridge is formed between the first air groove and a circumferential surface of the rotor core, and wherein a fifth magnetic bridge is formed between the second air groove and the circumferential surface of the rotor core.

14. The motor of claim 10, wherein the first air sub-groove further comprises a plurality of first teeth and a plurality of first slots that are alternately distributed.

15. The motor of claim 10, wherein the first bonding element further comprises a plurality of second teeth and a plurality of second slots that are alternately distributed.

16. The motor of claim 10, wherein the first tooth and the first slot are rectangular in shape.

17. The motor of claim 10, wherein the first tooth and the first slot are triangular in shape.

18. The motor of claim 10, wherein the first bonding element is a non-magnetic high-hardness material.

19. The motor of claim 18, wherein the non-magnetic high-hardness material comprises an aluminum material or a ceramic material.

20. The motor of claim 10, wherein the first bonding element is engaged with the first air sub-groove in the rotor core to form a bearing structure.

* * * * *